US 11,233,390 B2

(12) United States Patent
Schaevitz et al.

(10) Patent No.: US 11,233,390 B2
(45) Date of Patent: Jan. 25, 2022

(54) TRANSIENT POWER MANAGEMENT CIRCUIT

(71) Applicant: Apple Inc., Cupertino, CA (US)

(72) Inventors: Samuel B. Schaevitz, Los Gatos, CA (US); Nicholas D. Shourounis, San Francisco, CA (US); Justin D. Schunick, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/739,277

(22) Filed: Jan. 10, 2020

(65) Prior Publication Data

US 2021/0075214 A1  Mar. 11, 2021

Related U.S. Application Data

(60) Provisional application No. 62/897,465, filed on Sep. 9, 2019.

(51) Int. Cl.
*H02H 9/00* (2006.01)
*H02M 3/04* (2006.01)

(52) U.S. Cl.
CPC .............. *H02H 9/005* (2013.01); *H02M 3/04* (2013.01)

(58) Field of Classification Search
CPC ......... H02H 9/005; H02H 9/002; H02M 3/04; H02M 2001/007; H02M 3/156; H02M 3/1582; H02J 7/345; H02J 7/0063; H02J 7/007; H02J 7/34; H02J 7/045
See application file for complete search history.

(56) References Cited

U.S. PATENT DOCUMENTS

| | | | |
|---|---|---|---|
| 2013/0170311 A1* | 7/2013 | Lai ........................... | H02J 7/345 365/228 |
| 2015/0108950 A1* | 4/2015 | Yun ...................... | H02J 7/00712 320/134 |
| 2015/0268709 A1* | 9/2015 | Morning-Smith ..... | G01R 31/64 307/23 |
| 2016/0164309 A1* | 6/2016 | Bonafe' .................. | H02J 7/007 320/167 |
| 2020/0281061 A1* | 9/2020 | Derks ................. | H02M 3/1582 |

* cited by examiner

*Primary Examiner* — John W Poos
*Assistant Examiner* — Alex W Lam
(74) *Attorney, Agent, or Firm* — Fletcher Yoder PC

(57) ABSTRACT

An electronic device can include a battery bus, a load having a transient power requirement, and a transient power management circuit coupled between the battery bus and the load and configured to meet the transient instantaneous power requirement of the load while maintaining a minimum voltage on the battery bus. The transient power management circuit can include a boost converter coupled between the battery bus and a capacitor bank, and the load may be coupled to the capacitor bank. A control circuit may be configured to operate the boost converter to charge the capacitor bank. A control switch may be coupled between the boost converter and the capacitor bank, and the control circuit may be further configured to limit inrush current into the capacitor bank. Additionally, a state of charge of the battery may be estimated from a time required to charge the capacitor bank.

13 Claims, 5 Drawing Sheets

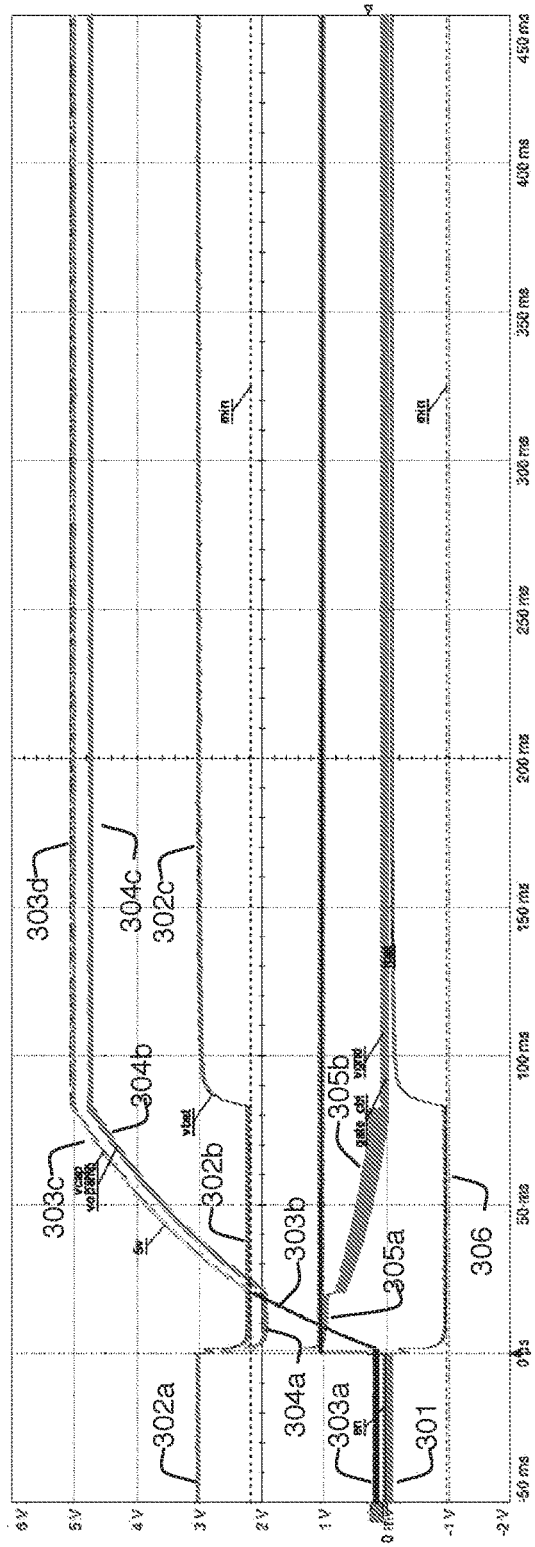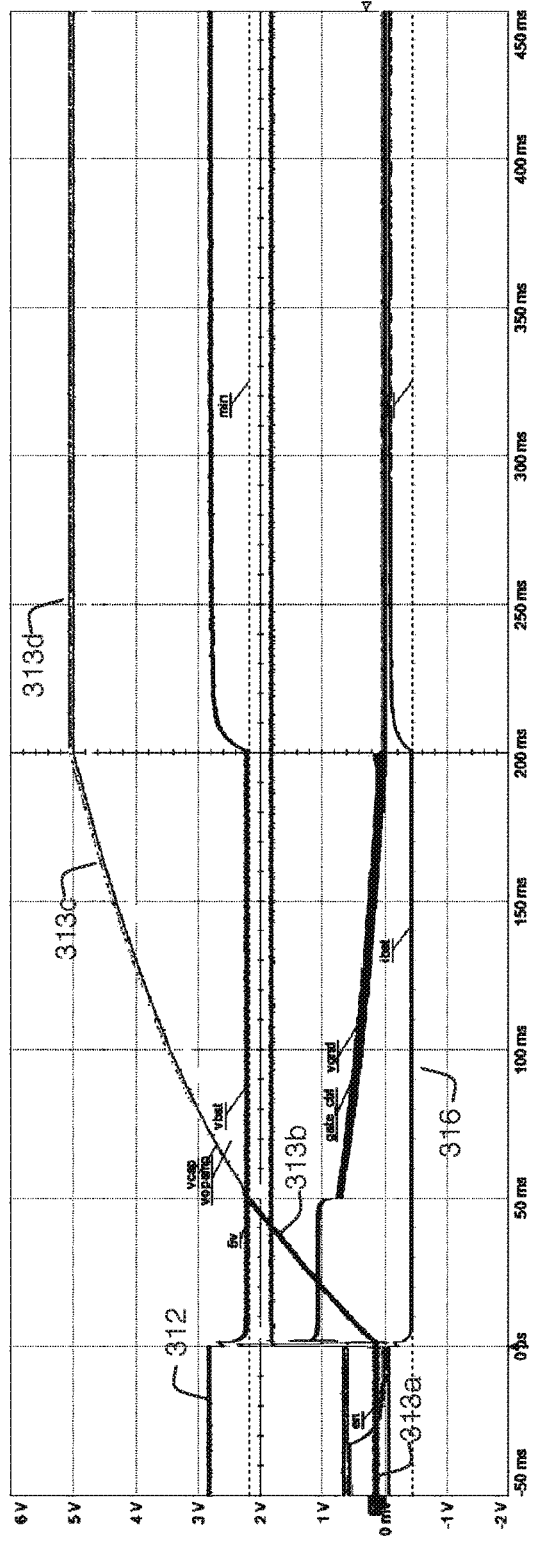
FIG. 3A
FIG. 3B

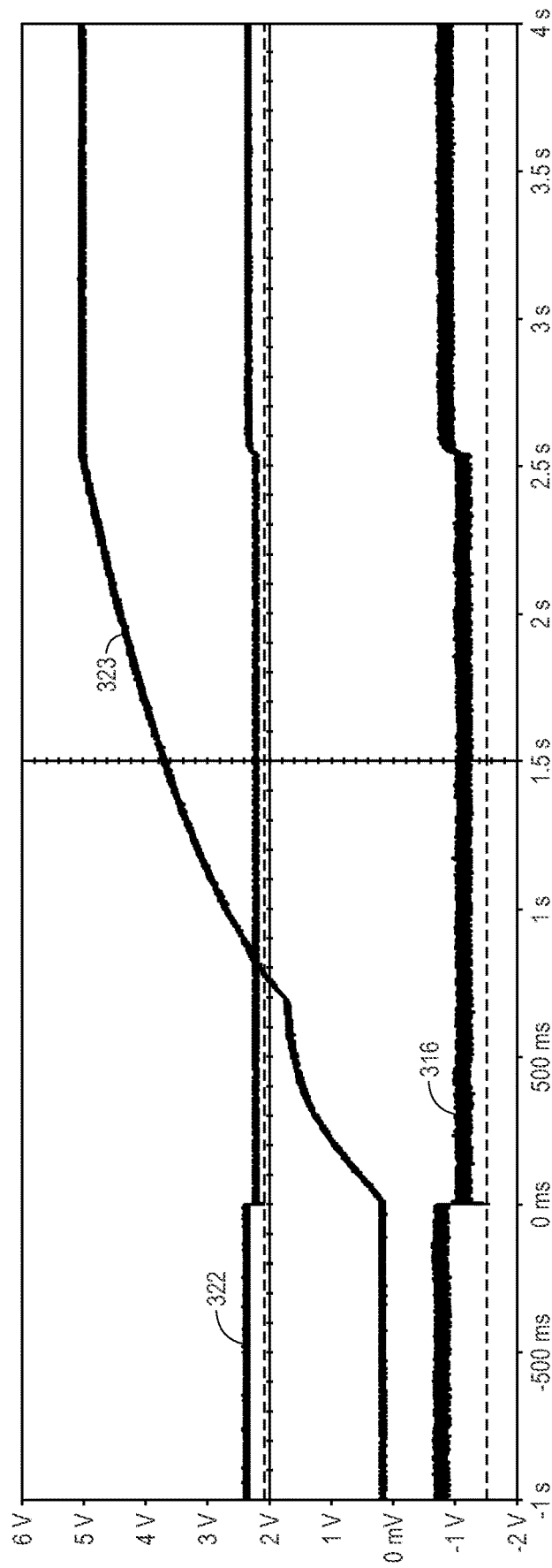

TRANSIENT POWER MANAGEMENT CIRCUIT

BACKGROUND

Advances in microelectronic circuits have allowed for creation of electronic devices having smaller and smaller footprints with ever increasing computational and communication capabilities. These advances have allowed for creation of new classes of electronic devices. Various challenges exist in providing power to such devices. It is generally desirable to power small portable or personal electronic devices with batteries. Much attention has been focused on high energy density rechargeable cells/batteries, such as lithium ion cells/batteries, for applications such as laptop and notebook computers, tablet computers, smartphones, and the like. However, for some applications, other battery chemistries may provide a better solution.

As an example, for applications in which the average power requirement is very low, it may be preferable to use a lithium metal cell/battery. Lithium metal cells are designed to have relatively long lifetimes as compared to many other battery chemistries. This may be advantageous from a user perspective, because it reduces the frequency with which the user must change the cells/batteries. Additionally, lithium metal cells are widely available in a "coin cell" form factor, including the CR20xx series, which makes sourcing replacement cells/batteries easy for the user. However, lithium metal cells may be somewhat limited in their instantaneous power delivery capabilities with respect to other battery chemistries. As a result, even if the average power requirements of an electronic device are sufficiently low, some transient power requirements of a device may be such that use of a lithium metal cell (or other long-life optimized cell) compromises operation of the device in situations calling for high but transient instantaneous power delivery.

Thus, what is needed in the art are circuits and techniques for adapting long-life optimized cells/batteries for use in devices that have relatively low average power requirements, but which may have relatively high, but transient, instantaneous power requirements.

SUMMARY

An electronic device can include a battery bus configured to be powered by a battery and at least one load having a transient instantaneous power requirement. The device can further include a transient power management circuit coupled between the battery bus and the at least one load. The transient power management circuit may be configured to meet the transient instantaneous power requirement of the at least one load while maintaining a minimum voltage on the battery bus. The electronic device may further include at least one load coupled to the battery bus, and the minimum voltage on the battery bus may be selected to prevent interrupting operation of the at least one load coupled to the battery bus.

The transient power management circuit can include a boost converter having an input coupled to the battery bus and an output coupled to a capacitor bank. The at least one load having a transient instantaneous power requirement may be coupled to the capacitor bank. The transient power management circuit may further include a control circuit configured to operate the boost converter to charge the capacitor bank. The boost converter may be a buck-boost converter. The transient power management circuit may further include a control switch coupled between the boost converter and the capacitor bank, and the control circuit may be further configured to limit inrush current into the capacitor bank to maintain a minimum voltage on the battery bus.

A transient power management circuit can include a boost converter having an input coupled to a battery bus and an output coupled to a capacitor bank and a control circuit configured to operate the boost converter to charge the capacitor bank while maintaining a minimum voltage on the battery bus. The minimum voltage on the battery bus may be selected to prevent interrupting operation of at least one load coupled to the battery bus. The boost converter may be a buck-boost converter. The transient power management circuit can further include a control switch coupled between the boost converter and the capacitor bank, and the control circuit is further configured to limit inrush current into the capacitor bank to maintain a minimum voltage on the battery bus.

The transient power management circuit can further include an operational amplifier configured to receive a battery bus voltage and a setpoint voltage and to generate therefrom an output signal to control the control switch and the boost converter. A bias supply of the operational amplifier may be coupled to the battery bus by a first diode and to the boost converter output via a second diode. At least one of the first and second diodes may be low forward voltage drop diodes.

A method of operating an electronic device comprising a transient power management circuit can include, responsive to an enabling of the transient power management circuit, operating the transient power management circuit to charge a capacitor bank while maintaining a minimum voltage on a battery bus and, responsive to the capacitor bank reaching a target voltage, operating a load coupled to the capacitor bank. Operating the transient power management circuit to charge a capacitor bank while maintaining a minimum voltage on the battery bus can include determining whether an output voltage of a boost converter coupled between the battery bus and the capacitor bank is greater than an input voltage of the boost converter. Responsive to a determination that the output voltage is less than the input voltage, the method can include operating a control switch as a linear regulator to regulate current flow from the battery bus to the capacitor bank. Responsive to a determination that the output voltage is greater than the input voltage, the method can include operating the boost converter to boost a voltage of the battery bus to a voltage of the capacitor bank.

The method of operating an electronic device comprising a transient power management circuit can further include determining whether continued operation of the load coupled to the capacitor bank is required. Responsive to a determination that continued operation of the load coupled to the capacitor bank is required, the method can further include operating the transient power management circuit to charge a capacitor bank while maintaining a minimum voltage on a battery bus. Responsive to a determination that continued operation of the load coupled to the capacitor bank is not required, the method can further include disabling the transient power management circuit.

A method of estimating battery state of charge from operation of a transient power management circuit configured to charge a capacitor bank while maintaining a minimum voltage on a battery bus can include measuring a time to charge the capacitor bank while maintaining a minimum voltage on the battery bus and comparing the measured time to a threshold to determine a battery state of charge. The method can further include performing a temperature compensation on the measured time before comparing the measured time to the threshold. Measuring the time to charge the capacitor bank while maintaining a minimum voltage on the battery bus can include making a plurality of charging time measurements and comparing the measured time to a threshold comprises comparing a moving average of the measurements to the threshold. The threshold may be stored in a lookup table. The threshold can include a plurality of time measurements correlated with a plurality of states of charge.

BRIEF DESCRIPTION OF THE DRAWINGS

FIGS. 3A-3C illustrate various waveforms associated with operation of a transient power management circuit as described herein.

DETAILED DESCRIPTION

Figure 1:
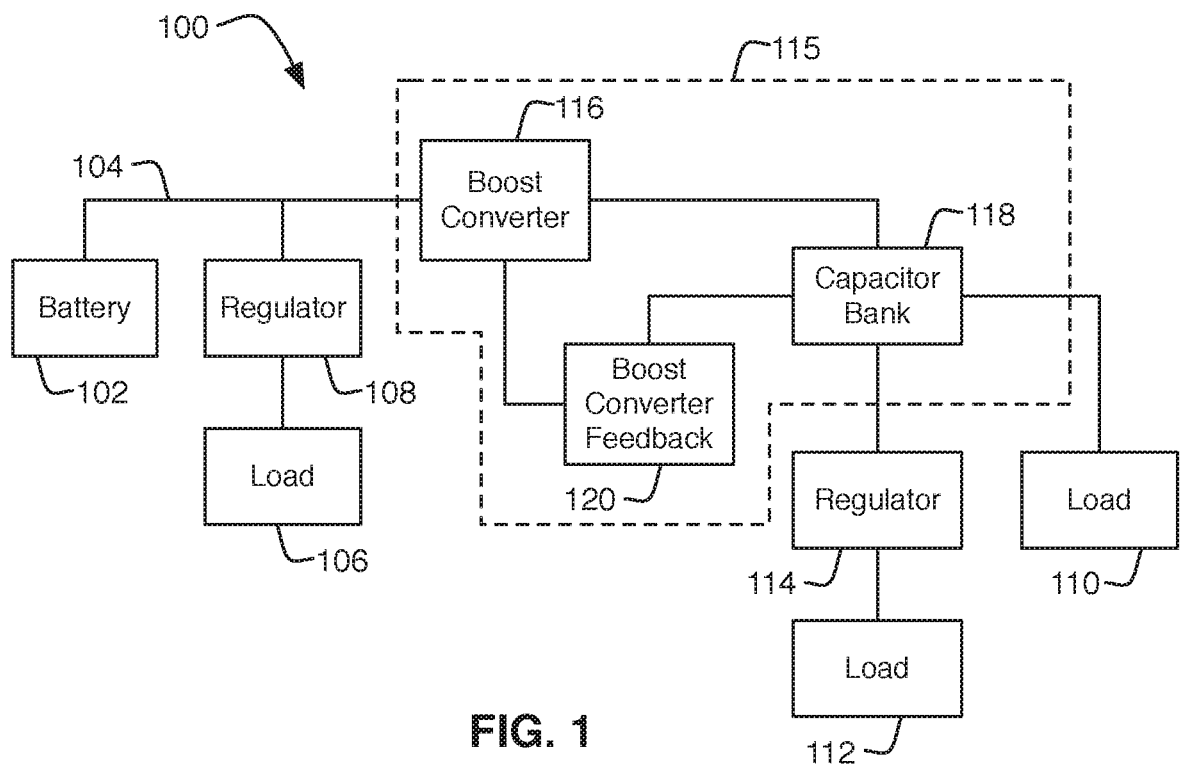
FIG. 1 depicts a block diagram of an electronic device incorporating a transient power management circuit.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Disclosed herein are various embodiments relating to transient power management in a portable or personal electronic device having low average power requirements, but high transient power requirements. In some embodiments, it may be desirable to provide a long-life optimized cell or battery for such devices. (Cell and battery are used somewhat interchangeably in this description, but one ordinarily skilled in the art will understand from context whether a specific reference most precisely requires a cell, a battery, or either one.) One example of a long-life optimized cell is the lithium metal cell, which are widely available in the "coin cell" form factors, such as the CR20xx series. However, it is to be understood that other long-life optimized cells may be used with the teachings herein, and that the transient power management circuits and techniques described herein are applicable to any application in which transient power requirements of a circuit may exceed the instantaneous power delivery capability of a cell/battery.

FIG. 1 depicts a high level block diagram of an electronic device 100. Electronic device 100 may include a plurality of loads, 106, 110, and 112. In some embodiments, more or fewer loads may be provided. As described in greater detail below, each of loads 106, 110, and 112 may be classified based on its power requirements/supply.

Each of loads 106, 110, and 112 (as well as other loads, if provided) may include one or more electronic subsystems, such as processing subsystems, communication subsystems, user interface (UI) subsystems, sensor subsystems, and the like. Processing subsystems may themselves include one or more systems or subsystems for computation, including central processing units (CPUs), graphics processing units (GPUs), microcontrollers, etc. Processing subsystems may also include storage systems or subsystems for maintaining the data operated on or acquired by the electronic device. These storage systems may include volatile or non-volatile random access memory (RAM), read only memory, flash storage, etc. Communication subsystems may include a wide variety of circuits and systems for wired or wireless communications, such as wired ethernet interfaces, wireless ethernet interfaces ("WiFi"), Bluetooth® interfaces, and/or other radio or other electromagnetic interfaces. User interface subsystems may also include a wide variety of further systems or subsystems, including those for communicating information to or receiving information from a user. Such user interface subsystems may include visual indicators (such as LEDs, displays, etc.), audible indicators (such as speakers, buzzers, etc.), tactile indicators (such as vibratory transducers, etc.), input devices (pushbuttons, capacitive sensors, etc.), or any other system/subsystem suitable for communicating information to or receiving information from a user. Sensor subsystems may include one or more sensors for detecting properties of the physical environment in which electronic device 100 is located, including, for example, location sensors (e.g., global positioning system a/k/a GPS sensors), environmental condition sensors (e.g., temperature, pressure, and/or humidity sensors), motion sensors (e.g., accelerometers), and the like.

In some embodiments, one or more loads may incorporate electronic subsystems that incorporate multiple systems or subsystems from the exemplary categories discussed above. For example, a load may include a system on a chip (SOC) that incorporates communication, storage, and communication systems in a single device. The foregoing description of various subsystems is meant as a general discussion of a few examples of the sorts of electronic devices and functionalities that may be provided by the various loads of electronic device 100.

With further reference to FIG. 1, each of the loads 106, 110, and 112 may ultimately be powered by a battery 102. As noted above, this battery may, in some embodiments, be a long-life optimized battery. In any case, the battery may be one that is capable of meeting the average power requirements of electronic device 100 but may be limited with respect to the transient power requirements of certain loads. For purposes of the following discussion, the loads 106, 110, and 112 may be classified based on their power requirements with respect to the capabilities of battery 102. Load 106 may have instantaneous and transient power requirements capable of being met by battery 102. Thus load 106 may be powered from battery bus 104.

In some embodiments, an additional regulator 108 may be provided to regulate/convert the battery bus 104 voltage to something suitable for load 106. As an example, if battery 102 is a lithium metal cell, it may have a nominal voltage of 3V, which may vary between 3V and 2.5V (or less) during the life/operation of the battery. Load 106 may be a supervisory processor/controller in the form of an integrated circuit that requires a 1.8V power supply. Thus, regulator 108 may be a buck converter that steps down the voltage of battery bus 104 to the 1.8V level required by load 106. If load 106 required a higher voltage than would be provided by battery 102, regulator 108 could be a boost converter. In other embodiments where load 106 requires a voltage that might be above or below the battery voltage, regulator could be a buck-boost regulator. In other embodiments, regulator 108 could be any other suitable regulator type, even including a linear or low dropout (LDO) regulator, although the inefficiencies with such regulators may not be appropriate in some applications. Finally, some embodiments may include a load that may be powered from the battery bus 104 without further regulation, although no such loads are illustrated in the exemplary electronic device 100 depicted in FIG. 1.

Loads 110 and 112 may have transient power requirements that are greater than can be reliably supplied by battery 102. For example, loads 110 and 112 may be such that their current requirements in certain transient conditions would cause the voltage of battery bus 104 to drop below some minimum level needed to keep load 106 in operation. Nonetheless, loads 110 and 112 may have average power requirements that are within the capabilities of battery 102. Such loads may include relatively more powerful processing systems, communication systems, or user interface elements that are only operated intermittently. To power such loads, a transient power management circuit 115 may be provided. Transient power management circuit 115 may include a capacitor bank 118, which may be configured to store energy sufficient to meet the transient power requirement of loads 110 and 112. Transient power management circuit may also include a boost converter 116 configured to charge capacitor bank 118 (from battery bus 104) under the control of boost converter feedback circuitry 120.

Although the energy required to meet transient demands of loads 110 and 112 may be stored in capacitor bank 118, it will be appreciated that using energy stored in a capacitor (or capacitor bank) requires discharging the capacitor, which decreases the voltage across the capacitor bank. As a result, in some embodiments, the voltage of bus 105 supported by capacitor bank 105 may vary widely. For example, the voltage of bus 105 may vary from 2V (or less) to 5V (or more). For some loads, e.g., 110, this level of voltage variation may be tolerable. For example, if load 110 is a loudspeaker configured for delivering an audible signal to a user, such a voltage variation may only affect the loudness of the sound produced. Additionally, other mitigations may be employed as to when the tones are delivered to allow the voltage to recover. For other loads, e.g., load 112, this level of voltage variation may not be acceptable, in which case a regulator 114 may be employed. Depending on the voltage requirements of load 112, regulator 114, may be a buck regulator, a boost regulator, a buck-boost regulator or other suitable regulator type.

Boost converter feedback circuitry 120 may be configured to regulate the operation of boost converter AA16 to provide sufficient energy storage in capacitor bank 118 to operate intermittent loads 112 and 110 without drawing too much energy from battery 102. One condition that may be considered as drawing too much energy from battery 102 is drawing so much current from battery 102 that the voltage of battery bus 104 falls below a level required for regulator 108 to provide the required voltage to load 106. Such conditions could result in a brown out or other power interruption to load 106. Another condition that may be considered as drawing too much energy from battery 102 is drawing so much current from battery 102 that the battery is damaged. As an example, lithium metal cells may exhibit permanently decreased cell voltage and permanently increased cell resistance if large currents are drawn from the batteries. If these currents are excessively large, the cell may be considered as damaged.

These and other conditions may provide limits on the rate at which boost converter 116 may draw energy from battery 102 to charge capacitor bank 118. Thus, in some embodiments, it may be desirable for boost converter feedback circuitry 120 to operate boost converter in such a way to charge capacitor bank 118 to its maximum voltage (e.g., 5V or 5.5V) but to do so while limiting the input voltage dip so that the voltage on battery bus 105 remains above a certain level, e.g., 2.2V.

Figure 2:
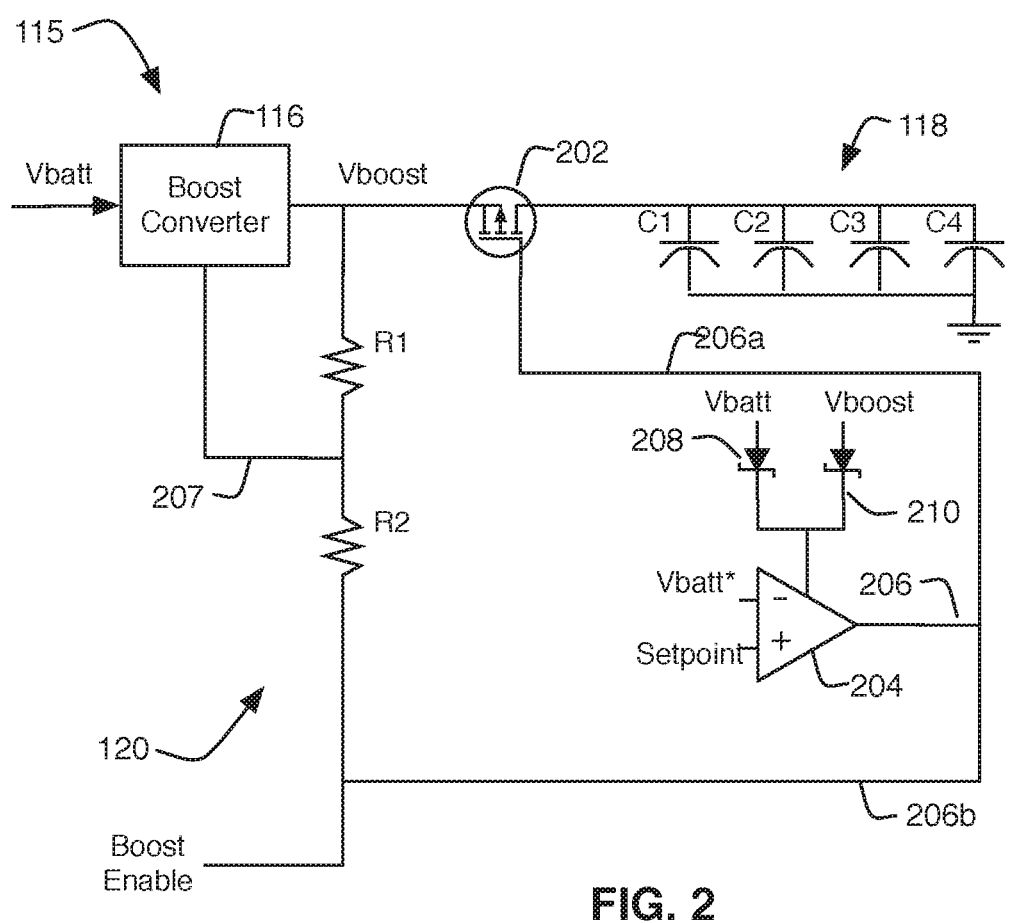
FIG. 2 depicts a simplified schematic diagram of a transient power management circuit for an electronic device.

FIG. 2 illustrates a simplified schematic diagram of transient power management circuit 115 that may be configured to perform as described above. In the simplified schematic diagram of FIG. 2, capacitor bank 118 has been expanded to show four parallel capacitors C1-C4. Depending on the particular requirements of a given embodiment, more or fewer capacitors having various constructions and capacitance values may be provided. In some embodiments, banks of polymer tantalum capacitors may be used. In simplified schematic diagram of FIG. 2, boost converter 116 is still illustrated in block diagram form. Boost converter 116 may be a conventional boost converter that boosts the battery bus voltage Vbatt to the boost bus voltage Vboost. In other embodiments, boost converter 116 may be a bidirectional buck-boost converter (which boosts the battery bus voltage Vbatt to Vboost in the forward direction and bucks the capacitor bus voltage Vboost back down to Vbatt in the reverse direction). Such a configuration may allow loads on the battery bus to be powered from the capacitor bank in certain situations where this may be desired.

The boost output (Vboost) of boost converter 116 is coupled to capacitor bank 118 by control switch 202, the operation of which is described in greater detail below. Switching of boost converter 116 may be controlled/modulated by feedback signal 207. Feedback signal 207 is generated as a function of the output/capacitor bank voltage Vboost and the input voltage (Vbatt) as described in greater detail below. Simplified schematic FIG. 2 has expanded boost converter feedback circuitry 120 into a simplified schematic circuit depicting pertinent aspects of the control scheme for boost converter 116 and control switch 202. The simplified schematic circuit includes operational amplifier 204 which generates an output signal 206. This output signal BB06 is used to control both control switch 202 (via signal 206a) and switching of the boost converter (via signal 206b).

Output signal 206 is generated by comparing a modified battery voltage signal Vbatt*, which is applied to the inverting input of operational amplifier 204, to a control signal (Setpoint) applied to the non-inverting input of operational amplifier 204. These input signals may be best understood as operating in two regimes. A first regime is the startup regime, in which the boost converter output/capacitor bank voltage Vboost is less than the battery bus/boost converter input voltage Vbatt. Because Vboost is less than Vbatt, boost converter 116 is not switching, but rather is acting as a pass through. However, because of the large output capacitance of capacitor bank 118, a direct pass through could result in a high inrush current into capacitor bank 118 that would pull down the battery bus voltage Vbatt to an unacceptably low level. Control switch 202 may thus be used as a soft start mechanism to reduce this inrush current and the associated voltage dip on the input battery bus.

More specifically, the setpoint voltage may be coupled to the battery rail Vbatt by an RC circuit and a selectively activated enable signal (not shown). Thus, when the system is activated, the Setpoint signal may begin at the Vbatt voltage (e.g., a nominal 3V for lithium metal coin cells) and ramp downward to a selected minimum battery voltage bus setpoint (e.g., 2.2V) at a rate determined by the time constant of the RC circuit. This signal is applied to the Setpoint input of operational amplifier 204. Meanwhile, the battery voltage is coupled to the inverting input. As a result of the comparison between the modified battery voltage Vbatt* to the Setpoint signal, operational amplifier output signal 206 controls control switch 202 to allow current flow from the battery bus, through the non-switching boost converter 116, to the capacitor bank 118. This allows capacitor bank 118 to be charged substantially linearly to the battery bus voltage (Vbatt), which is regulated to the selected minimum value. In other words, control switch 202 operates as a linear/low dropout regulator to bring the voltage of capacitor bank 118 up to the battery bus voltage relatively linearly.

Once output voltage of the boost converter (Vboost) has reached the input voltage (Vbatt), boost converter may begin switching. In this second regime, a/k/a the boosting regime, the setpoint signal applied to the non-inverting input of operational amplifier 204 may be a pulse width modulation (PWM) ramp signal. This ramp signal may be generated in a variety of ways. One way to generate such a signal is to use a couple an on/off enable signal to a fixed voltage via an RC circuit. Selectively enabling/disabling this signal will alternately charge/discharge the RC circuit generating a ramp signal that may be used as a PWM reference as compared to the minimum battery bus reference Vbatt*. Variation in the level of the battery reference signal Vbatt as compared to this ramp signal will vary operational amplifier output signal 206, which may be coupled via path 206b to the feedback path of boost converter 116.

More specifically, signal 207 is the feedback signal that controls the switching duty cycle or frequency of the switch(es) in boost converter 116. Conventional output voltage regulated boost converters may use an output voltage signal derived from the voltage divider made up of resistor R1 and resistor R2 coupled across the output. Because the illustrated transient power management circuit requires regulating the input voltage into boost converter 116, the virtual ground side of this feedback path may be coupled to the output signal 206 of operational amplifier 204 via output path 206b. Output signal 206 will vary in response to the battery bus voltage and Setpoint PWM ramp signal to alter feedback signal 207 to operate the switches of boost converter 116 to bring its output voltage Vboost, and thus the voltage of capacitor bank 118 up to its setpoint, while maintaining the input voltage Vbatt above the minimum level designated.

FIGS. 3A-3C illustrate various voltage and current curves for an exemplary embodiment corresponding to the startup operations described above. The values given in the following description are but one exemplary embodiment and are provided only for context of explanation. It will be appreciated that the actual voltages, currents, times, etc. may vary from one embodiment to another.

FIG. 3A corresponds to a startup condition with a new battery, with the startup occurring at the 0ms time label. Prior to this point, the enable signal 301 is low (0mv). The battery voltage Vbatt is at 3V (302a), and the capacitor bank is at 0V as indicated by curve 303a. When the system is enabled, the battery voltage drops down to the minimum setpoint level of approximately 2.2V, as indicated by curve 302b. During the initial portion of this interval, the capacitor voltage is increasing linearly (curve 303b), as the boost converter is not switching, and the control switch 202 is regulating the capacitor voltage responsive to gate control voltage 305a. Battery current curve 306 shows current being drawn from the battery.

Approximately 20 ms after startup, when the capacitor voltage curve 303 crosses the battery voltage curve 302, the boost converter begins switching. At this point, the capacitor voltage increases inverse parabolically as shown by curve 303c. The operational amplifier output voltage 206 follows a similar curve 304b, offset by one diode forward voltage drop as explained in greater detail below. During this same interval, the gate control voltage 305b is decreasing until control switch 202 is turned fully on. Again during this interval, current is being drawn from the battery as indicated by battery current curve 306.

At approximately 80 ms, the capacitor bank has been charged up to its target voltage of 5V, as illustrated by curve 303d. Operational amplifier output voltage 206 remains approximately one diode forward voltage drop below this voltage level (304c) as explained below. Once the capacitor bank has reached its target voltage, the current drawn from the battery will decrease, as illustrated in curve 306. As a result, the voltage of the battery bus will climb back to the no-load battery voltage of 3V (in the illustrated example), as illustrated by curve 302c.

FIG. 3B illustrates the same startup sequence with a battery that has been used, but still has a significant amount of life remaining. As can be seen, the time for capacitor voltage to go from 0 (313a), through the linear region 313b, through the inverse parabolic region 313c, to its final target value 313d has increased from about 80 ms to about 200 ms. This is a consequence of the battery being able to supply less current (316) while maintaining the same battery voltage 312. As explained in greater detail below, this increase in charging time may be used as a measurement of battery state of charge. (It will be appreciated that the enable voltage curve, operational amplifier output curve, and control switch gate drive curve are illustrated but unlabeled in FIG. 3B.)

FIG. 3 illustrates the same curves for a battery that has reached the end of its useful life. As can be seen the battery voltage curve 322 starts out at a value of approximately 2.3V, well below its nominal 3V rating. It is known in the art that lithium metal cell voltage does not necessarily correlate with state of charge, but in this instance the cell voltage is substantially reduced. As a result, when the system is enabled at time 0ms, it takes much longer (2.5 s) for the capacitor voltage 323 to reach its target value. This is a function of the much lower current (316) available from the battery without dropping the battery bus voltage below the minimum value setpoint.

Turning briefly back to FIG. 2, and with reference to capacitor bank voltage curve 303 and operational amplifier output voltage curve 304 in FIG. 3, it can be seen that the analog control circuitry of FIG. 2, namely operational amplifier 204 must be provided with a sufficiently high bias voltage to generate the required control signals. Powering capacitor 204 from the battery bus (Vbatt) can allow for operation of the operational amplifier whenever the transient power management circuit is enabled. However, the minimum voltage that the battery bus reaches during capacitor bank charging may prevent the bias voltage supplied to the operational amplifier from being sufficiently high to generate the required drive signal. Alternatively, if operational amplifier 204 is powered from the capacitor bank, which will have a sufficiently high voltage during operation, it will not be operable when the transient power management circuit is disabled. This issue may be resolved by providing a dual-bias supply to operational amplifier 204, in which the battery bus and the boost converter output (or capacitor bank voltage) are both coupled to the operational amplifier power input via diodes. To minimize power loss, these diodes may be low forward voltage drop diodes (e.g., Schottky diodes). Thus, the bias supply to operational amplifier 204 at any point in time will be the greater voltage of either Vbatt (the battery bus voltage) or the boost converter output (the capacitor bank voltage).

Figure 4:
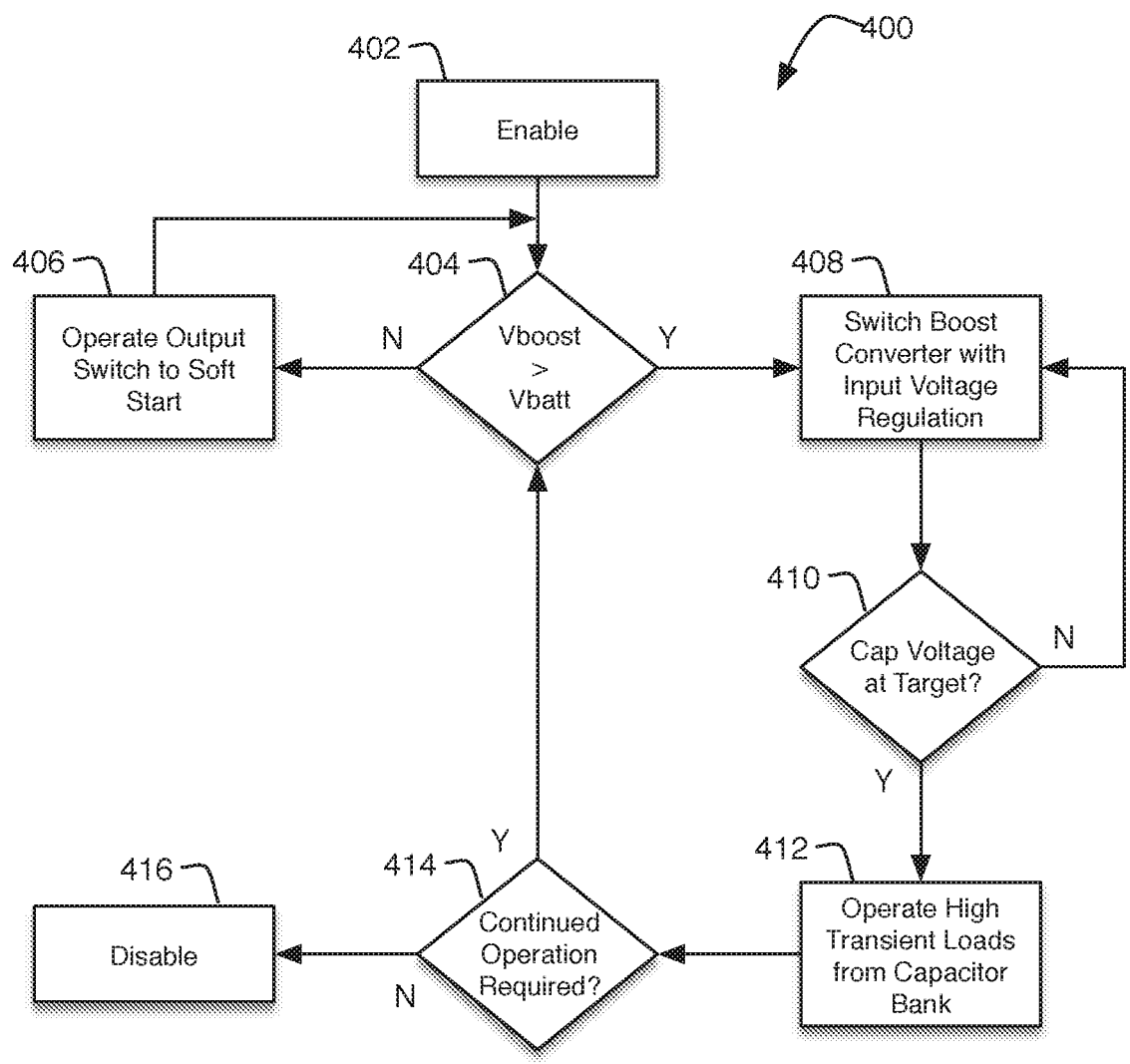
FIG. 4 illustrates a flow chart of operation of a transient power management circuit as described herein.

FIG. 4 is a flow chart depicting an operating sequence for a transient power management circuit as described above. If it is determined that a high transient load is required, the transient power management circuit may be enabled at block 402. The controller of the circuit may then determine whether the boost converter output voltage is greater than the battery bus voltage (block 404). If not, the control circuit may soft start the transient power management circuit (block 406) as described above, e.g., using control switch 202 to modulate current flow from battery bus, through the non-operating boost converter 116, to the capacitor bank 118. This soft starting process may continue until the capacitor bank voltage is above the battery bus voltage.

Once the boost converter output voltage (i.e., the capacitor bank voltage) is greater than the battery bus voltage (which will have decreased to its minimum allowed value as described above), boost converter switching may begin (block 408), with the transient power management circuit controller modulating switching of the boost converter until capacitor bank reaches its target voltage (block 410). Once the capacitor bank has reached its target voltage, the high transient current loads may be operated from the capacitor bank (block 412).

As the high transient loads are operated from the capacitor bank, it may be determined by a supervisory controller whether continued operation of these high transient loads is required (block 414). (In general, the supervisory controller may determine how frequently to operate the high transient current loads based considerations including the amount of energy remaining in the battery, the amount of energy presently stored in the capacitor bank, and the amount of time required to recharge the capacitor bank.) If continued operation of the high transient current loads is required, control may return to block 404, where it is determined whether the capacitor bank voltage is greater than or less than the battery bus voltage, and the controller may continue as described above. Alternatively, if no further operation of the high transient current loads is required, the transient power management circuit may be disabled (block 416).

As noted above, a system including a transient power management circuit along the lines described herein may control how often to operate a high transient current load based at least in part on the state of charge of the battery and/or the amount of time required to recharge the capacitor bank of the transient power management circuit. In other words, load events may be spread out in time as necessary when using the energy stored in the capacitor bank. This can allow the load to draw its full rated current, and therefore have full power and full performance as required, although operating less frequently as the time required to recharge the capacitor bank recharges. As illustrated above, the state of charge of the battery and the amount of time required to recharge the capacitor bank of the transient power management circuit are directly correlated, with longer recharge times correlating with decreased states of charge. It will be appreciated by those skilled in the art that there is also a strong temperature dependence/correlation, although the skilled artisan will be able to implement appropriate temperature compensation techniques to mitigate these effects.

In one application, an electronic device as described above can be or include a locator tag. A locator tag may be a tag intended to be placed on a personal item, such as a keyring, bag, backpack, briefcase, notebook, personal electronic device, or the like. The locator tag may be equipped with various electronics configured to allow a user to locate the locator tag (and thus the associated personal item) using an application running on another computing device. In some embodiments, the locator tag may include a system on a chip or other programmed/programmable processor that can execute instructions associated with the locator function. The SoC or other processor may be connected as load 106 or as load 112 in FIG. 1. The SoC may interface with a GPS (global positioning system) chip or other locator technology based on various radio frequency (RF) technologies, including exchange of location information with other nearby electronic devices. Exchange of location information may be achieved by using any of a variety of wireless communication technologies, including, by way of example but not limitation, Bluetooth, WiFi, cellular data, LoRa (low power wide area networking), or other narrow band or wide band communication techniques. The locator device and communication device may be connected as load 106 or 112 as illustrated in FIG. 1.

In some embodiments, the locator tag may also include an audible or visible alarming system that can beep (or make other noises) or flash to draw attention to the locator tag and/or associated personal item. These alarming systems may be relatively high current loads that may be connected as load 110 as described above. Furthermore, as described above, based on the state of charge of battery 102 and the energy stored in capacitor bank 118, load 110 may be intermittently operated (under direction of the processing system), with the intervals of operation selected so as to rely on energy stored in capacitor bank 118 without over drawing current from battery 102 as was described above. As a result, the tones or flashes from the audible or visible alarming system may be triggered at different intervals as it takes longer for capacitor bank 118 to recharge as battery 102 ages. Nonetheless, the pattern of noises or flashes from the alarming system may maintain a desired level of loudness and/or brightness, as well as a suitable identification pattern regardless of the state of battery 102.

Figure 5:
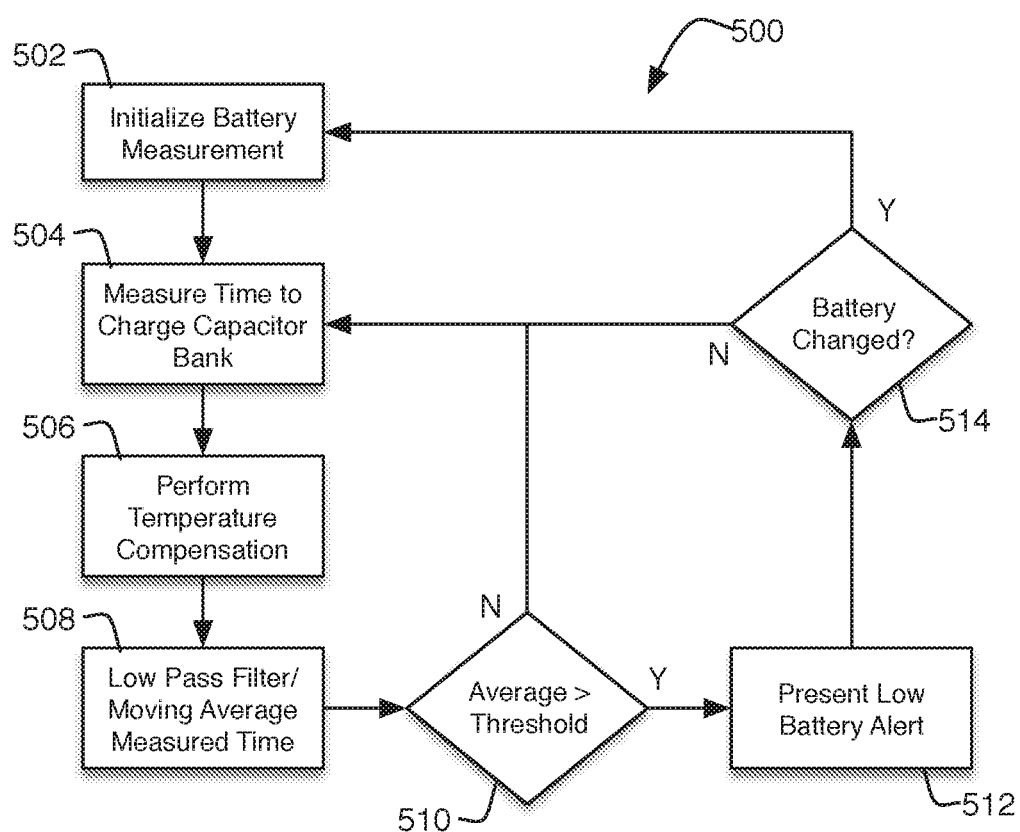
FIG. 5 illustrates a flow chart of a cell/battery state of charge estimation technique that may be implemented with a transient power management circuit as described herein.

FIG. 5 illustrates a process 500 for determining a battery state of charge from the capacitor bank charge time. This process may, for example, be executed by a supervisory controller of a personal or portable electronic device incorporating a transient power management circuit as described herein. The supervisory controller may be one of the loads coupled to the battery bus (e.g., load 106), so that it is always powered. Process 500 begins with initialization of the battery measurement at block 502. This may include receiving an indication that a new battery has been provided. When the transient power management circuit is triggered, the controller may measure the required time to charge the capacitor bank (block 504). This time value may be temperature compensated in any appropriate manner (block 506). The temperature compensated charge time measurement so obtained may be compared to a series of characterized charge time vs. state of charge values, which may, for example, be stored in a look up table of the controller. This comparison may yield a current state of charge of the battery, which may be stored, used for reference in other calculations, reported to a user, etc.

Additionally, or alternatively, the temperature compensated charge time measurement may be subjected to a low pass filter or moving average (block 508) to filter out any short term variations. This may result in a filtered/averaged temperature compensated charge time measurement that may be compared to a threshold (block 510) to determine whether battery replacement is required. If the moving average/low pass filtered value remains above a low battery warning threshold, the process may continue with further time measurements being made with further activations of the transient power management circuit. If, however, the filtered/averaged time value is below the warning threshold, a low battery alert may be presented to a user (block 512), so that the battery may be replaced before operation of the device is compromised. In this latter case, the system may determine whether the battery has been replaced (block 514). If not, the system may continue to may continue to monitor the charge time and state of charge, with continued storage/reporting of the state of charge as appropriate. Alternatively, if the battery has been changed (block 514), the battery measurement routines may be reinitialized, which may include resetting the filtered/averaged values and or any stored values, with the process repeating as desired.

Described above are various features and embodiments relating to transient power management circuits. Such circuits may be used in a variety of applications but may be particularly advantageous when used in conjunction with devices that include loads with a low average power requirement but intermittent, transient high power requirements that are powered by batteries optimized for long life at the expense of high instantaneous power delivery. Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. An electronic device comprising:
 a battery bus configured to be powered by a battery;
 a first load coupled to the battery bus;
 a second load having a transient instantaneous power requirement;
 a transient power management circuit coupled between the battery bus and the second load, the transient power management circuit meeting the transient instantaneous power requirement of the second load while maintaining a minimum voltage on the battery bus, wherein the minimum voltage on the battery bus is selected to prevent interrupting operation of the first load coupled to the battery bus and wherein the transient power management circuit comprises:
  a boost converter having an input coupled to the battery bus and an output coupled to a capacitor bank, wherein the second load having a transient instantaneous power requirement is coupled to the capacitor bank;
  a control switch coupled between the boost converter and the capacitor bank; and
  a control circuit that operates the boost converter to charge the capacitor bank, wherein the control circuit further limits inrush current into the capacitor bank, but not the first load, to maintain the minimum voltage on the battery bus.

2. The electronic device of claim 1 wherein the boost converter is a buck-boost converter.

3. A transient power management circuit comprising:
 a boost converter having an input coupled to a battery bus and an output coupled to a capacitor bank;
 a control switch coupled between the boost converter and the capacitor bank and
 a control circuit that operates the boost converter to charge the capacitor bank while maintaining a minimum voltage on the battery bus, wherein:
  the control circuit limits inrush current into the capacitor bank to maintain a minimum voltage on the battery bus without limiting current to at least one load coupled to the battery bus; and
  the minimum voltage on the battery bus is selected to prevent interrupting operation of the at least one load.

4. The transient power management circuit of claim 3 wherein the boost converter is a buck-boost converter.

5. The transient power management circuit of claim 3 further comprising an operational amplifier configured to receive a battery bus voltage and a setpoint voltage and to generate therefrom an output signal to control the boost converter.

6. The transient power management circuit of claim 5 wherein a bias supply of the operational amplifier is coupled to the battery bus by a first diode and to the boost converter output via a second diode.

7. The transient power management circuit of claim 6 wherein at least one of the first and second diodes are low forward voltage drops diodes.

8. A method of operating an electronic device comprising a transient power management circuit, the method comprising:
 responsive to an enabling of the transient power management circuit, operating the transient power management circuit to charge a capacitor bank while maintaining a minimum voltage on a battery bus by limiting inrush current into the capacitor bank but not at least one load coupled to the battery bus, wherein the minimum voltage on the battery bus is selected to prevent interrupting operation of the at least one load and wherein operating the transient power management circuit to charge a capacitor bank while maintaining a minimum voltage on the battery bus further comprises:
  determining whether an output voltage of a boost converter coupled between the battery bus and the capacitor bank is greater than an input voltage of the boost converter;

responsive to a determination that the output voltage is less than the input voltage, operating a control switch as a linear regulator to regulate current flow from the battery bus to the capacitor bank; and responsive to a determination that the output voltage is greater than the input voltage, operating the boost converter to boost a voltage of the battery bus to a voltage of the capacitor bank;

responsive to the capacitor bank reaching a target voltage, operating a load coupled to the capacitor bank.

9. The method of claim 8 further comprising:

determining whether continued operation of the load coupled to the capacitor bank is required;

responsive to a determination that continued operation of the load coupled to the capacitor bank is required, operating the transient power management circuit to charge a capacitor bank while maintaining a minimum voltage on a battery bus; and responsive to a determination that continued operation of the load coupled to the capacitor bank is not required, disabling the transient power management circuit.

10. A method of estimating battery state of charge from operation of a transient power management circuit configured to charge a capacitor bank while maintaining a minimum voltage on a battery bus, the method comprising:

measuring a time to charge the capacitor bank while maintaining a minimum voltage on the battery bus by making a plurality of charging time measurements; and comparing the measured time to a threshold to determine a battery state of charge by comparing a moving average of the measurements to the threshold.

11. The method of claim 10 further comprising performing a temperature compensation on the measured time before comparing the measured time to the threshold.

12. The method of claim 10 wherein the threshold is stored in a lookup table.

13. The method of claim 12 wherein the threshold comprises a plurality of time measurements correlated with a plurality of states of charge.

* * * * *